United States Patent
Lim

(10) Patent No.: US 11,151,411 B2
(45) Date of Patent: *Oct. 19, 2021

(54) METHOD AND ELECTRONIC DEVICE FOR PROVIDING TEXT-RELATED IMAGE

(71) Applicant: Samsung Electronics Co., Ltd., Suwon-si (KR)

(72) Inventor: Yusun Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

This patent is subject to a terminal disclaimer.

(21) Appl. No.: 16/788,827

(22) Filed: Feb. 12, 2020

(65) Prior Publication Data

US 2020/0184257 A1    Jun. 11, 2020

Related U.S. Application Data

(63) Continuation of application No. 15/848,473, filed on Dec. 20, 2017, now Pat. No. 10,579,902.

(30) Foreign Application Priority Data

Dec. 21, 2016 (KR) .................. 10-2016-0175839
Nov. 8, 2017 (KR) .................. 10-2017-0148327

(51) Int. Cl.
*G06K 9/62* (2006.01)
*G06N 3/08* (2006.01)
(Continued)

(52) U.S. Cl.
CPC ......... *G06K 9/6215* (2013.01); *G06K 9/6293* (2013.01); *G06K 9/66* (2013.01);
(Continued)

(58) Field of Classification Search
CPC ...... G06K 9/6215; G06K 9/6293; G06K 9/66; G06N 3/084; G06N 3/08; G06N 3/0445; G06N 3/088; G06N 3/04
See application file for complete search history.

(56) References Cited

U.S. PATENT DOCUMENTS

| 2014/0081633 A1* | 3/2014 | Badaskar ............... G10L 15/26 704/235 |
| 2015/0088859 A1* | 3/2015 | Weissl ................ G06F 16/9566 707/722 |

(Continued)

FOREIGN PATENT DOCUMENTS

KR    10-1300052 B1    8/2013

OTHER PUBLICATIONS

Kuznetsova et al. "Collective Generation of Natural Image Descriptions", Proceedings of the 50th Annual Meeting of the Association for Computational Linguistics, pp. 359-368 (Year: 2012).*

(Continued)

*Primary Examiner* — Qian Yang
(74) *Attorney, Agent, or Firm* — Jefferson IP Law, LLP

(57) ABSTRACT

An artificial intelligence (AI) system for simulating functions such as recognition, determination, and so forth of human brains by using a mechanical learning algorithm like deep learning, or the like, and an application thereof is provided. A method of providing a text-related image is provided. The method includes obtaining a text, determining at least one image related to the obtained text based on a degree of relatedness between a result of applying a first AI data recognition model to the obtained text and a result of applying a second AI data recognition model to a user-accessible image, and displaying the determined at least one image to a user.

18 Claims, 13 Drawing Sheets

(51) Int. Cl.
G06N 3/04 (2006.01)
G06K 9/66 (2006.01)

(52) U.S. Cl.
CPC ............ G06N 3/0445 (2013.01); G06N 3/08 (2013.01); G06N 3/084 (2013.01); G06N 3/04 (2013.01); G06N 3/088 (2013.01)

(56) References Cited

U.S. PATENT DOCUMENTS

| | | | |
|---|---|---|---|
| 2015/0100561 A1* | 4/2015 | Li | G06F 16/44 |
| | | | 707/706 |
| 2015/0161268 A1* | 6/2015 | Dasher | G06F 16/50 |
| | | | 707/728 |
| 2015/0331929 A1 | 11/2015 | El-Saban et al. | |
| 2016/0148072 A1 | 5/2016 | Chan et al. | |

OTHER PUBLICATIONS

Krishnamoorthy et al. "Generating Natural-Language Video Descriptions Using Text-Mined Knowledge", vol. 27 No. 1 (2013): Twenty-Seventh AAAI Conference on Artificial Intelligence (Year: 2013).*

* cited by examiner

METHOD AND ELECTRONIC DEVICE FOR PROVIDING TEXT-RELATED IMAGE

CROSS-REFERENCE TO RELATED APPLICATION(S)

This application is a continuation application of prior application Ser. No. 15/848,473, filed on Dec. 20, 2017, which was based on and claimed priority under 35 U.S.C § 119(a) of a Korean patent application filed on Dec. 21, 2016 in the Korean Intellectual Property Office and assigned Serial number 10-2016-0175839 and of a Korean patent application filed on Nov. 8, 2017 in the Korean Intellectual Property Office and assigned Serial number 10-2017-0148327, the disclosure of each of which is incorporated by reference herein in its entirety.

TECHNICAL FIELD

The present disclosure relates to a method and apparatus for providing a text-related image.

BACKGROUND

An artificial intelligence (AI) system is a computer system that implements human-level intelligence, and allows a machine to learn by itself, make decisions, and become smarter, unlike an existing rule-based smart system. As the AI system is used, the AI system has an improved recognition rate and accurately understands a user's preference, such that the existing rule-based smart systems is are gradually being replaced with deep-learning-based AI systems.

AI technology includes machine learning (deep learning) and element technologies using machine learning.

Machine learning is an algorithm technique that classifies/learns characteristics of input data by itself, and element technologies are technologies that simulate a function such as recognition, decision making, etc., of a human brain by using a machine-learning algorithm such as deep learning, and includes technical fields such as linguistic understanding, visual understanding, inference/prediction, knowledge representation, operation control, and so forth.

The AI technology is employed in various fields. For example, linguistic understanding is a technique that recognizes, and applies/processes human languages/texts, and includes natural language processing, machine interpretation, a conversation system, question and answer processing, voice recognition/synthesis, and so forth. Visual understanding is a technique that recognizes and processes an object in the same manner as a human visual system, and includes object recognition, object tracking, image searching, people recognition, scene understanding, space understanding, image enhancement, etc. Inference/prediction is a technique that determines information and performs logical inference and prediction, and includes knowledge/probability-based inference, optimization prediction, preference-based planning/recommendation, and so forth. Knowledge representation is a technique that automatizes human experience information as knowledge data, and includes knowledge establishment (data creation/classification), knowledge management (data utilization), and the like. Operation control is a technique that controls autonomous driving of a vehicle and motion of a robot, and includes motion control (navigation, collision, driving), manipulation control (action control), and so forth.

The AI technology may also be used to provide an image, in which a related image may be provided considering a context of a text, without a separate keyword input or an image tag.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for providing a text-related image to a user, in which an image properly corresponding to a text is provided using a data learning result.

Additional aspects will be set forth in part in the description which follows and, in part, will be apparent from the description, or may be learned by practice of the presented embodiments.

In accordance with an aspect of the present disclosure, an electronic device is provided. The electronic device includes a user input interface configured to obtain a text, a memory configured to store a computer-executable instruction, at least one processor coupled to the memory is configured to determine at least one image related to the obtained text based on a degree of relatedness between a result of applying a first artificial intelligence (AI) data recognition model to the obtained text and a result of applying a second AI data recognition model to a user-accessible image, and a display configured to display the determined at least one image.

In accordance with another aspect of the present disclosure, an electronic device is provided. The electronic device includes a user input interface configured to obtain a text, at least one processor configured to search for at least one image related to the obtained text, a transceiver configured to transmit a request for the at least one image related to the obtained text to a server, and receive the at least one image related to the obtained text, which is determined based on a degree of relatedness between a result of applying a first AI data recognition model to the obtained text and a result of applying a second AI data recognition model to a user-accessible image, in response to the request, under control of the at least one processor, and a display configured to display the received at least one image.

In accordance with another aspect of the present disclosure, a method of providing a text-related image is provided. The method includes obtaining a text, determining at least one image related to the obtained text based on a degree of relatedness between a result of applying a first AI data recognition model to the obtained text and a result of applying a second AI data recognition model to a user-accessible image, and displaying the determined at least one image to a user.

In accordance with another aspect of the present disclosure, a method of providing a text-related image is provided. The method includes obtaining a text, transmitting the obtained text and a request for at least one image related to the obtained text to a server, receiving at least one image related to the transmitted text based on a degree of relatedness between a result of applying a first AI data recognition model to the transmitted text and a result of applying a second AI data recognition model to a user-accessible image, in response to the request, and displaying the received at least one image.

In accordance with another aspect of the present disclosure, a computer-readable recording medium having recorded thereon a program for executing the method according to the third aspect and the method according to the fourth aspect on a computer is provided.

Other aspects, advantages, and salient features of the disclosure will become apparent to those skilled in the art from the following detailed description, which, taken in conjunction with the annexed drawings, discloses various embodiments of the pre sent disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
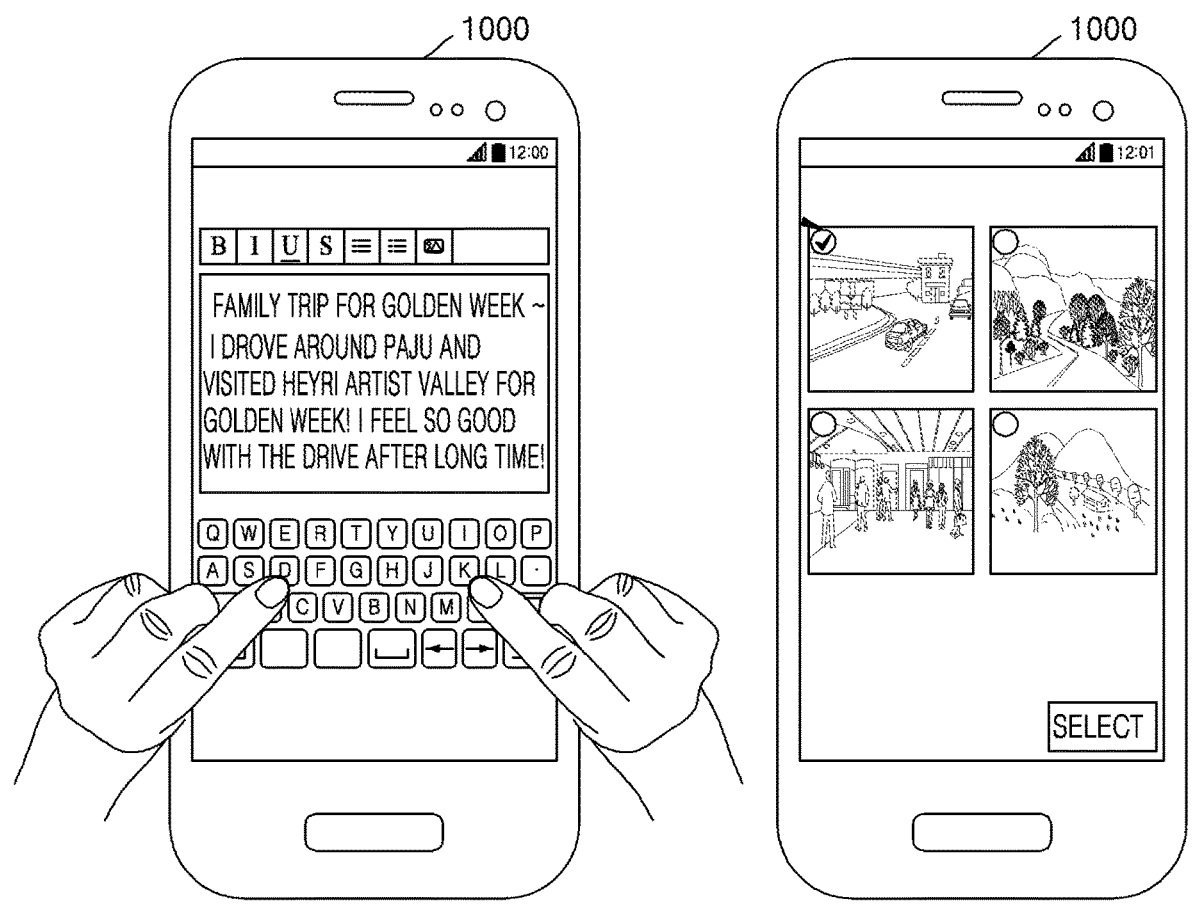
FIG. 1 is a view for describing a system for providing a text-related image according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "and/or" includes any and all combinations of one or more of the associated listed items. Expressions such as "at least one of," when preceding a list of elements, modify the entire list of elements and do not modify the individual elements of the list.

The present specification describes the principle of the present disclosure and discloses various embodiments to clarify the scope of the present disclosure and to allow those of ordinary skill in the art to carry out the present disclosure. Disclosed embodiments may be implemented in various forms.

Herein, when an element is connected to another element, the element is not only directly connected to another element but also electrically connected to another element with another element intervening in them. If it is assumed that a certain element includes a certain element, the term 'including' means that a corresponding element may further include other elements unless a specific meaning opposed to the corresponding element is written.

Although the terms including ordinal numbers such as "first" and "second" used herein may be used to describe various elements, these terms do not limit the corresponding elements. These terms may be used for the purpose of distinguishing one element from another element.

Throughout the specification, the term "application" means a set of computer programs designed to perform a specific task. A variety of applications may be described herein. For example, the applications may include, but not limited to, a web browser, a camera application, a data transmission application, a music playback application, a video playback application, a message application, a social communicator application, a social media application, a social networking service (SNS) application, a gallery application, a memo application, a calendar application, a phone book application, etc.

Throughout the specification, the term "user interface (UI)" means a medium through which an electronic device and a user interact with each other. The user may input a text to the electronic device through the UI, and the electronic device may display a result corresponding to the input through the UI.

Throughout the specification, the term "user input" may include, but not limited to, at least one of a touch input, a bending input, a voice input, a key input, and a multimodal input.

Throughout the specification, the term "text" means data intended to deliver a meaning to a partner. The "text" may include data in the form of a natural language such as a character, a symbol, a word, a phrase, a sentence, a diagram, a chart, etc., and data or voice data in the form of an artificial language character string.

Throughout the specification, an identical reference numeral will indicate an identical element. The present disclosure does not describe all elements of various embodiments, and general information in the technical field of the present disclosure or repeated information over the various embodiments will be omitted. A "part" or "portion" used herein may be implemented with software or hardware, and depending on various embodiments, a plurality of "parts" or "portions" may be implemented with one unit or element or one "part" or "portion" may include a plurality of elements.

In the present disclosure (especially, in the claims), the use of "the" and other demonstratives similar thereto may correspond to both a singular form and a plural form. Unless the order of operations of a method according to the present disclosure is explicitly mentioned or described otherwise, the operations may be performed in a proper order. The present disclosure is not limited by the order the operations are mentioned.

Hereinafter, the operating principle and various embodiments of the present disclosure will be described in detail with reference to the accompanying drawings.

FIG. 1 is a view for describing a system for providing a text-related image according to an embodiment of the present disclosure.

Referring to FIG. 1, the system according to an embodiment may include an electronic device 1000. However, all the illustrated elements are not essential elements. The system may be implemented with a larger or smaller number of elements than the illustrated elements. For example, the system may include the electronic device 1000 and a server (not shown).

The electronic device 1000 according to an embodiment may be implemented in various forms. For example, examples of the electronic device 1000 may include, but not limited to, a smart phone, a smart television (TV), a digital camera, a laptop computer, a tablet personal computer (PC), an electronic (e)-book terminal, a digital broadcasting terminal, a personal digital assistant (PDA), a portable multimedia player (PMP), a navigator, a Moving Picture Experts Group phase 1 or phase 2 (MPEG-1 or MPEG-2) audio layer 3 (MP3) player, and the like. The electronic device 1000 described herein may be a wearable device that is wearable on a user. Examples of the wearable device may include, but not limited to, at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth. However, the following description will be made based assuming that the electronic device 1000 is a mobile terminal.

In an embodiment, the electronic device 1000 provides at least one application to the user. In this case, the user may input a text to an application provided in the electronic device 1000 through a UI. For example, the user may input a text "Happy to drive around Paju with my family for Golden Week", using a character application.

In an embodiment, the user may desire to insert a suitable image corresponding to a content based on the overall context of the text, while inputting the text.

In an embodiment, if the application to which the user inputs the text does not store an image, the user may call another application or a function thereof, which includes an image, such as the web browser, the camera application, the gallery application, etc., to access the image. For example, the electronic device 1000 may transmit an image browsing request to another application in response to the user input.

In an embodiment, the electronic device 1000 may access the image by executing an image browsing function in the application, without transmitting the image browsing request to another application.

For example, based on a context of a user-input text "Family trip for Golden Week ~ I drove around Paju and visited Heyri Artist Valley for Golden Week! I feel so good with the drive after a long time", the electronic device 1000 may preferentially provide, to the user, pictures including at least one of an image captured during long holidays that may be called Golden Week, an image captured on the way to Paju, an image of Paju's Healing Road, and an image of a sunny day reflecting a good mood of the user.

According to an embodiment, even if the user does not input a separate keyword, the electronic device 1000 may recognize a user's intention, obtain an image matching the context of the text, and preferentially provide the obtained image to the user, such that the user may select one or more suitable images from among at least one images provided by the electronic device 1000, without having to search for and selecting suitable images one by one. Since this feature relieves the user's burden of searching for images, the feature may become more effective for a larger number of images. Unlike a keyword-based search where only images stored corresponding to user-set keywords are searched for, the electronic device 1000 may provide an image matching an intention of the user inputting a text, by considering the overall context of the text.

Figure 2:
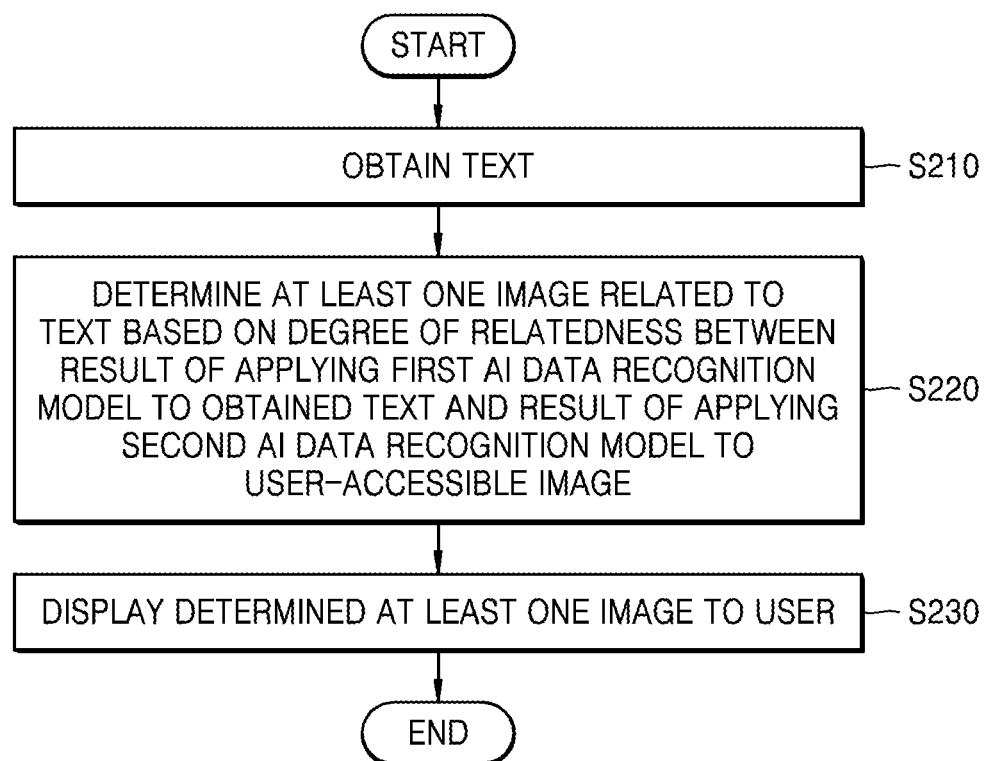
FIG. 2 is a flowchart of a method of providing a text-related image by an electronic device according to an embodiment of the present disclosure.

FIG. 2 is a flowchart of a method of providing a text-related image by an electronic device according to an embodiment of the present disclosure.

Referring to FIG. 2, in operation S210, the electronic device 1000 obtains a text. In an embodiment, the electronic device 1000 may receive input of a text from the user, retrieve a text stored in another application by executing the application, or receive a text from an external device or a web server through a network. For example, if the user uses the message application, the electronic device 1000 may receive a text previously input to the memo application by the user, by executing the memo application based on a user input.

In operation S220, the electronic device 1000 determines at least one image related to the text based on a degree of relatedness between a result of applying a first artificial intelligence (AI) data recognition model to the text and a result of applying a second AI data recognition model to a user-accessible image.

In an embodiment, the electronic device 1000 may obtain the user-accessible image. The user-accessible image according to an embodiment may include at least one of an image previously stored in the electronic device 1000, an image that may be received from an external device communicating with the electronic device 1000, and an image that may be received from a server. For example, the electronic device 1000 may obtain a previously stored image by executing the gallery application, etc. The electronic device 1000 may receive an image from an external server. For example, the electronic device 1000 may access a social network server, a cloud server, or a content providing server to download an image. The electronic device 1000 may capture an image using a camera included in the electronic device 1000. The electronic device 1000 may capture an image by executing the camera application.

In an embodiment, determination of an image related to a text may be performed by learning by at least one learning model. For example, the first AI data recognition model may be a model for a text, and the second AI data recognition model may be a model for an image. In an embodiment, the first AI data recognition model and the second AI data recognition model may be the same as or different from each other. For example, the first AI data recognition model and the second AI data recognition model may be established based on deep neural network-based learning.

In an embodiment, if the first AI data recognition model is applied to a text, a result considering situations inferable from the applied text may be derived, and if the second AI data recognition model is applied to an image, a result considering situations inferable from the applied image may be derived, such that two results may be compared to determine a degree of relatedness. For example, a result of applying an AI data recognition model may be a value or a vector value. The degree of relatedness may include a difference between values, a distance between vector values, or the like. For example, the electronic device 1000 may determine, as an image related to a text, an image in which a difference between values or a distance between vector values is less than or equal to a threshold value. The electronic device 1000 may determine a high relation between the text and the image for a high degree of relatedness. The AI data recognition model will later be described in more detail with reference to FIG. 6.

In an embodiment, once the electronic device 1000 obtains the text in operation S210 after the electronic device 1000 stores a result of applying the second AI data recognition model to the user-accessible image in the electronic device 1000, the electronic device 1000 obtains a result of applying the first AI data recognition model to the obtained text and compares the obtained result with the stored result, thus determining an image related to the text.

In operation S230, the electronic device 1000 displays the determined at least one image to the user.

In an embodiment, the electronic device 1000 may display the determined at least one image based on a degree of relatedness. For example, the electronic device 1000 may display a plurality of images related to the text in a descending degree of relatedness order or an ascending degree of relatedness order. The order in which the electronic device 1000 displays the plurality of images may be previously set by the user. For example, the electronic device 1000 may set displaying in the descending degree of relatedness order by default to allow the user to easily select an image matching the text.

Hereinbelow, a description will be made with reference to FIG. 3 of an operation in which the user selects one or more of at least one image displayed by the electronic device 1000 and the electronic device 1000 newly learns an AI data recognition according to user's selection.

Figure 3:
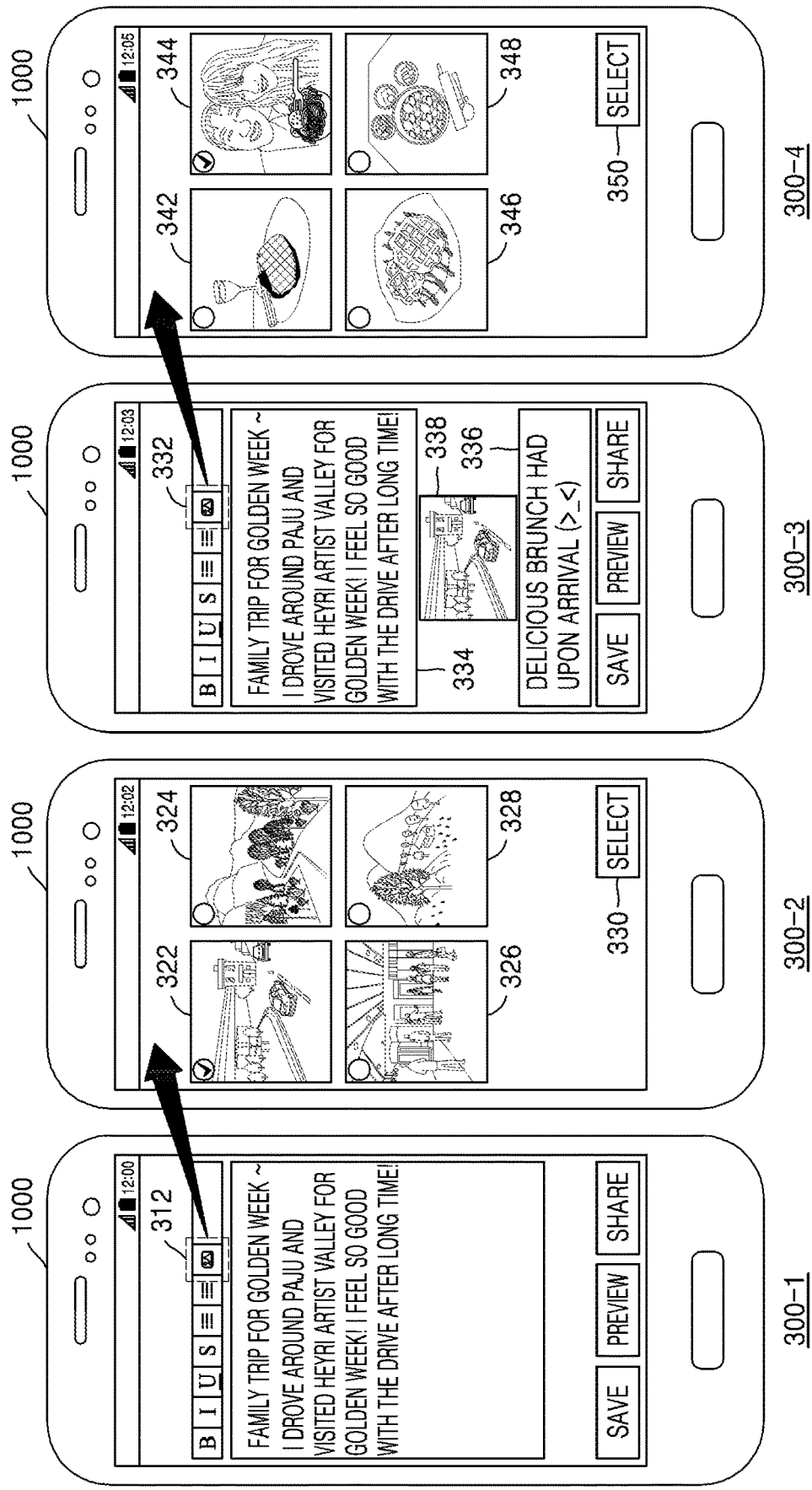
FIG. 3 illustrates an example in which an electronic device provides a text-related image according to an embodiment of the present disclosure.

FIG. 3 illustrates an example in which an electronic device provides a text-related image according to an embodiment of the present disclosure.

Referring to 300-1 of FIG. 3, the electronic device 1000 according to an embodiment provides a first application (e.g., an SNS application) to the user who inputs a text through a UI. The electronic device 1000 may receive a typing input of the user and obtain the text.

In an embodiment, the user may desire to insert an image related to the input text while inputting the text to the first application. For example, to access an image, the electronic device 1000 may transmit an instruction for calling a second application (e.g., the gallery application) to the second application by receiving a user's input of touching or clicking a gallery UI 312, and thus execute the second application. In an embodiment, the touch input means a gesture, etc., made by the user on a touch screen to control the electronic device 1000. For example, the touch input described herein may include a tap, a touch & hold, a double tap, a drag, panning, a flick, a drag & drop, and so forth.

Referring to 300-2 of FIG. 3, in response to execution of the second application executed for user's access to an image, the electronic device 1000 may display a first image 322, a second image 324, a third image 326, and a fourth image 328 which are related to the text. According to an embodiment, the first application may transmit the text to the second application, together with a request for browsing a text-related image.

According to an embodiment, in response to the request, the second application may determine and display at least one image related to the obtained text based on a degree of relatedness between a result of applying the first AI data recognition model to the text and a result of applying the second AI data recognition model to an image stored in the second application.

In an embodiment, to determine an image related to the text "Family trip for Golden Week ~ I drove around Paju and visited Heyri Artist Valley for Golden Week! I feel so good with the drive after a long time!", the electronic device 1000 may consider an image including a situation of a drive with families, an image of a sunny day reflecting a user's good mood, and so forth.

In an embodiment, the electronic device 1000 may further consider metadata about an image. In an embodiment, the metadata about the image may include at least one of location information of a location where an image is captured (e.g., using a global positioning system (GPS)) and time information of the time when the image is captured. For example, the electronic device 1000 may further consider an image captured during long holidays that may be called Golden Week, an image captured on the way to Paju, and an image of Paju's Healing Road that is a famous road for driving in Paju, by using the metadata about the image.

In an embodiment, the electronic device 1000 may determine the first image 322, captured in Golden Week, including a situation of driving around Paju in the sunny day background, as an image having the highest degree of relatedness with the text. For example, the electronic device 1000 may also determine that the first image 322, the second image 324, the third image 326, and the fourth image 328 have a degree of relatedness with the text in a descending order and provide the first image 322, the second image 324, the third image 326, and the fourth image 328 to the user by arranging the first image 322, the second image 324, the third image 326, and the fourth image 328 in the order of the descending relatedness degree order.

In an embodiment, the electronic device 1000 may receive a user input of selecting a select button 330 to select one or more images from among the first image 322, the second image 324, the third image 326, and the fourth image 328 displayed. The select button 330 may be a physical button attached to the electronic device 1000 or a virtual button in the form of a graphical user interface (GUI). For example, as the user presses or touches the first image 322 and presses or touches the select button 330, the electronic device 1000 may receive an input of selecting the first image 322 from among the first image 322, the second image 324, the third image 326, and the fourth image 328 displayed. As the user selects the first image 322, the electronic device 1000 displays the first image 322 together with the text.

In an embodiment, the electronic device 1000 may learn an AI data recognition model based on the user's selection. In an embodiment, the electronic device 1000 may determine an image related to a text obtained later, based on the newly learned AI data recognition model. For example, the electronic device 1000 may newly store a result of the newly learned and updated AI data recognition model to the image. For example, if a text is input later, the electronic device 1000 may determine an image related to the text, based on a degree of relatedness between a result of applying the newly learned AI data recognition model to the text and a result of applying the newly learned AI data recognition model to a previously stored image.

Referring to 300-3 of FIG. 3, according to an embodiment, the electronic device 1000 receives a user input of inputting a first text 334 to the first application, inserts and displays a user-selected image 338 related to the first text 334, together with the first text 334, and then receives a user input of inputting a second text 336.

According to an embodiment, when the user desires to insert an image related to the second text 336, the electronic device 1000, to access an image, may transmit an instruction for calling the second application to the second application by receiving a user's input of touching or clicking the gallery UI 332, and thus execute the second application.

Referring to 300-4 of FIG. 3, according to an embodiment, in response to execution of the second application executed for user's access to an image, the electronic device 1000 may display a fifth image 342, a sixth image 344, a seventh image 346, and an eighth image 348 which are related to the second text 336.

According to an embodiment, to provide an image related to the second text 336, the first application may transmit the first text 334 and/or the second text 336, together with a request for browsing a text-related image, to the second application. For example, the first application may transmit only the second text 336 to the second application because the first text 344 has already been transmitted to the second application.

According to an embodiment, in response to the request, the second application may determine and display at least one image related to the second text 336 based on a degree of relatedness between results of applying the newly learned first AI data recognition model to the first text 334 and the second text 336 and results of applying the newly learned second AI data recognition model to an image stored in the second application.

In an embodiment, to determine an image related to the second text 336, the electronic device 1000 may consider the first text 334 and the image 338 related to the first text 334. For example, although the second text 336 includes only "delicious brunch had upon arrival (>_<b)", the electronic device 1000 may determine an image related to the second text 336 by considering all situations derived by analyzing a text "I drove to Paju with my family for Golden Week and had delicious brunch upon arrival at Heyri Artist Valley" that may be derived based on the first text 334. For example, although the electronic device 1000 may consider an image captured during long holidays that may be called Golden Week, an image captured on the way to Paju, an image of Paju's Healing Road that is the famous road for driving in Paju, an image of a sunny day reflecting the user's good mood due to the drive, an image captured together with the families, an image of Heyri Artist Valley, and an image related to the brunch, the electronic device 1000 may give higher weight values to the image of the brunch and an image captured upon arrival based on the second text 336 and determine a degree of relatedness between the second text 336 and the user-accessible image.

To determine an image related to the second text 336, the image 338 related to the first text 334 may also be considered, such that the user has already selected the image including the situation of driving to Paju as the image 338 related to the first text 344 and thus the electronic device 1000 determines that the user is not likely to select the image 338 again, and determines a degree of relatedness between the second text 336 and the user-accessible image by giving a low weight value to the image captured on the way to Paju.

According to an embodiment, when the user inputs the first text 334 and selects the image 338 related to the first text 334 and then inputs the second text 336, the electronic device 1000 may not have newly learned an AI data recognition model. In this case, the electronic device 1000 may determine an image related to the second text 336 by applying the AI data recognition model that have not been newly learned.

In an embodiment, the electronic device 1000 may determine that the fifth image 342, the sixth image 344, the seventh image 346, and the eighth image 348 have a degree of relatedness with the text in a descending order and provide the fifth image 342, the sixth image 344, the seventh image 346, and the eighth image 348 to the user by arranging the fifth image 342, the sixth image 344, the seventh image 346, and the eighth image 348 in the descending relatedness degree order.

However, in an embodiment, as the user selects the sixth image 344 from among the displayed images 342, 344, 346, and 348 and presses or touches a select button 350, the electronic device 1000 may receive a user input of selecting the sixth image 344 as an image having the highest degree of relatedness with the second text 336. Thus, the electronic device 1000 may display the sixth image 344 together with the second text 336.

As in the above embodiment, if the image having a high order of relatedness with the text, which is determined based on a result of applying an AI data recognition model to the text by the electronic device 1000, and the image selected by the user are different from each other, it may be meaningful for the electronic device 1000 to learn the AI data recognition model according to the user's selection result. As the electronic device 1000 continuously learns the AI data recognition model based on the user's selection result, the electronic device 1000 may determine an image related to a text more suitably for a user's intention.

Figure 4:
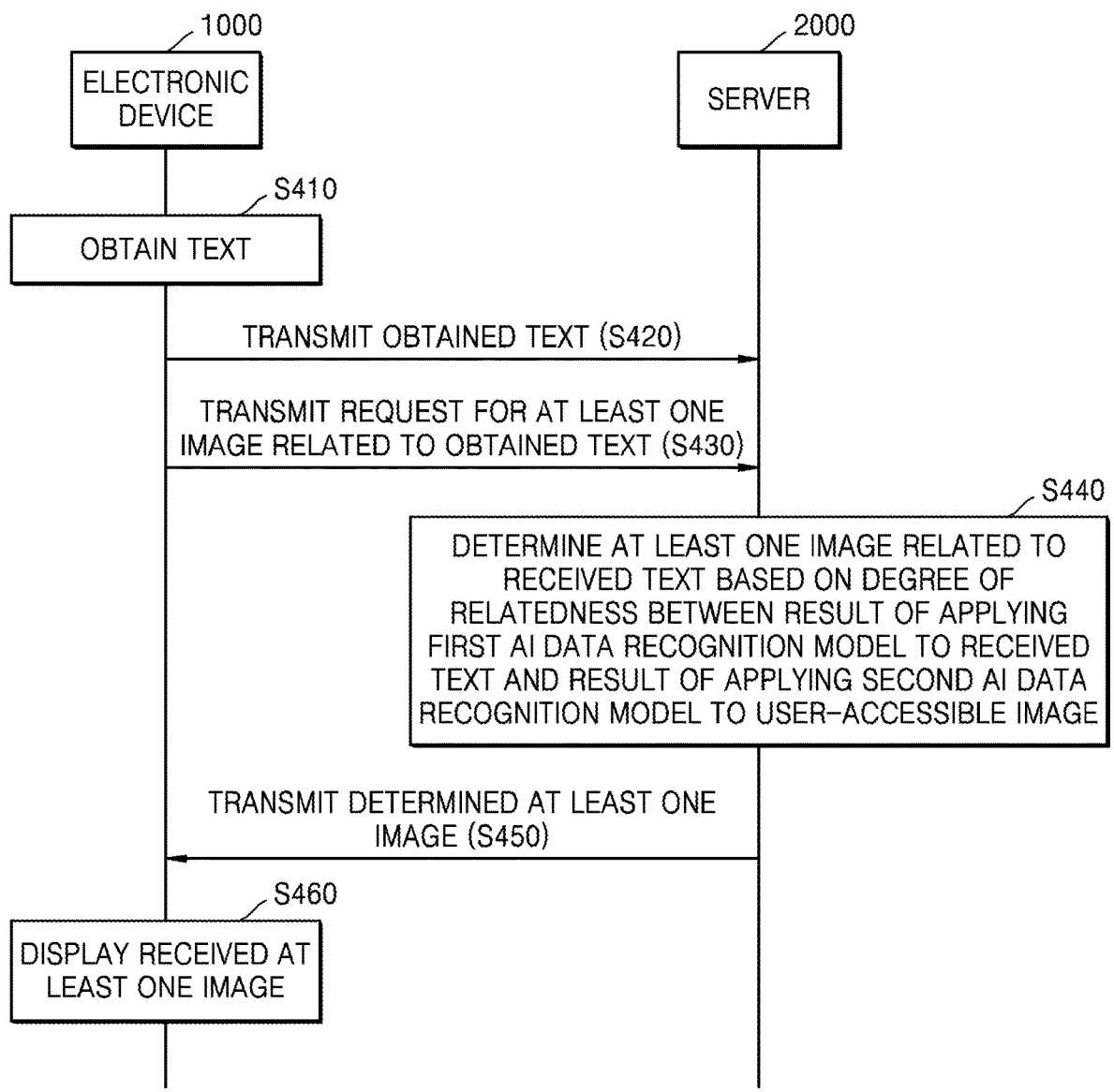
FIG. 4 is a flowchart of a method of providing a text-related image through a server by an electronic device according to an embodiment of the present disclosure.

FIG. 4 is a flowchart of a method of providing a text-related image through a server by an electronic device according to an embodiment of the present disclosure.

Referring to FIG. 4, in operation S410, the electronic device 1000 obtains a text. Operation S410 of obtaining the text corresponds to operation S210 of FIG. 2, and thus a detailed description thereof will be omitted.

In operation S420, the electronic device 1000 transmits the obtained text to the server 2000. For example, the electronic device 1000 transmits the obtained text to the server through the network. Herein, the network may be implemented with, but not limited to, a wireless communication technology or a mobile communication technology, such as Wi-Fi, home radio frequency (RF), Bluetooth (BT), high-rate wireless personal area network (HR-WPAN), ultra-wideband (UWB), a low-rate wireless personal area network (LR WPAN), the Institute of Electrical and Electronics Engineers (IEEE) 1394, and so forth.

In an embodiment, if the text is obtained from the server 2000 or the electronic device 1000 has already uploaded the text in the server 2000, the electronic device 1000 may not transmit the text to the server 2000. For example, if the electronic device 1000 obtains the text from the server 2000, transmission of the text to the server 2000 may be omitted, and only data requesting at least one image related to the text obtained from the server 2000 may be transmitted.

In operation S430, the electronic device 1000 transmits a request for at least one image related to the obtained text to the server 2000. For example, the electronic device 1000 may transmit the request to the server through the network.

In operation S440, the server 2000 determines at least one image related to the received text based on a degree of relatedness between a result of applying the first AI data recognition model to the received text and a result of applying the second AI data recognition model to the user-accessible image.

In an embodiment, the server 2000 may obtain the user-accessible image. The user-accessible image according to an embodiment may include at least one of an image previously stored in the server 2000, an image that may be received from an external device communicating with the server 2000, and an image that may be received from the electronic device 1000. For example, the server 2000 may obtain an image previously stored in a cloud server. The image previously stored in the cloud server may be an image stored in a space allocated to a user account of the cloud server.

In an embodiment, if the first AI data recognition model is applied to a text, a result considering situations inferable from the applied text may be derived, and if the second AI data recognition model is applied to an image, a result considering situations inferable from the applied image may be derived, such that two results may be compared to determine a degree of relatedness. For example, a result of applying an AI data recognition model may be a value or a vector value. The degree of relatedness may include a difference between values, a distance between vector values, or the like. For example, the server 2000 may determine, as an image related to a text, an image in which a difference between values or a distance between vector values is less than or equal to a threshold value. The AI data recognition model will later be described in more detail with reference to FIG. 6.

In operation S450, the server 2000 transmits the determined at least one image to the electronic device 1000.

For example, the server 2000 may not transmit the determined at least image to the electronic device 1000 through the network.

According to an embodiment, to reduce a data transmission burden, the server 2000 may transmit only additional information of the determined at least one image, instead of the determined at least one image, to the electronic device 1000. The additional information of the image may include a theme, a size, a creation date, a resolution, focusing, Joint Photographic Experts Group (JPEG) quality, GPS information, unique identifier (ID), a thumbnail image, a location of an image stored in the server 2000 (e.g., a uniform resource locator (URL)), and so forth. In an embodiment, the electronic device 1000 may obtain an image corresponding to the additional information by using the additional information received from the server 2000. For example, the electronic device 1000 may receive a unique ID of the image to identify that an image corresponding to the additional information is an image previously stored in the electronic device 1000, and display the previously stored image. For example, if an image is not previously stored in the electronic device 1000, a thumbnail image may be displayed to the user, and a location of an image stored in the server 2000 may be referred to download the image from the server 2000 if necessary.

In operation S460, the electronic device 1000 displays the received at least one image. Operation S460 of displaying the at least one image corresponds to operation S230 of FIG. 2, and thus a detailed description thereof will be omitted.

Figure 5:
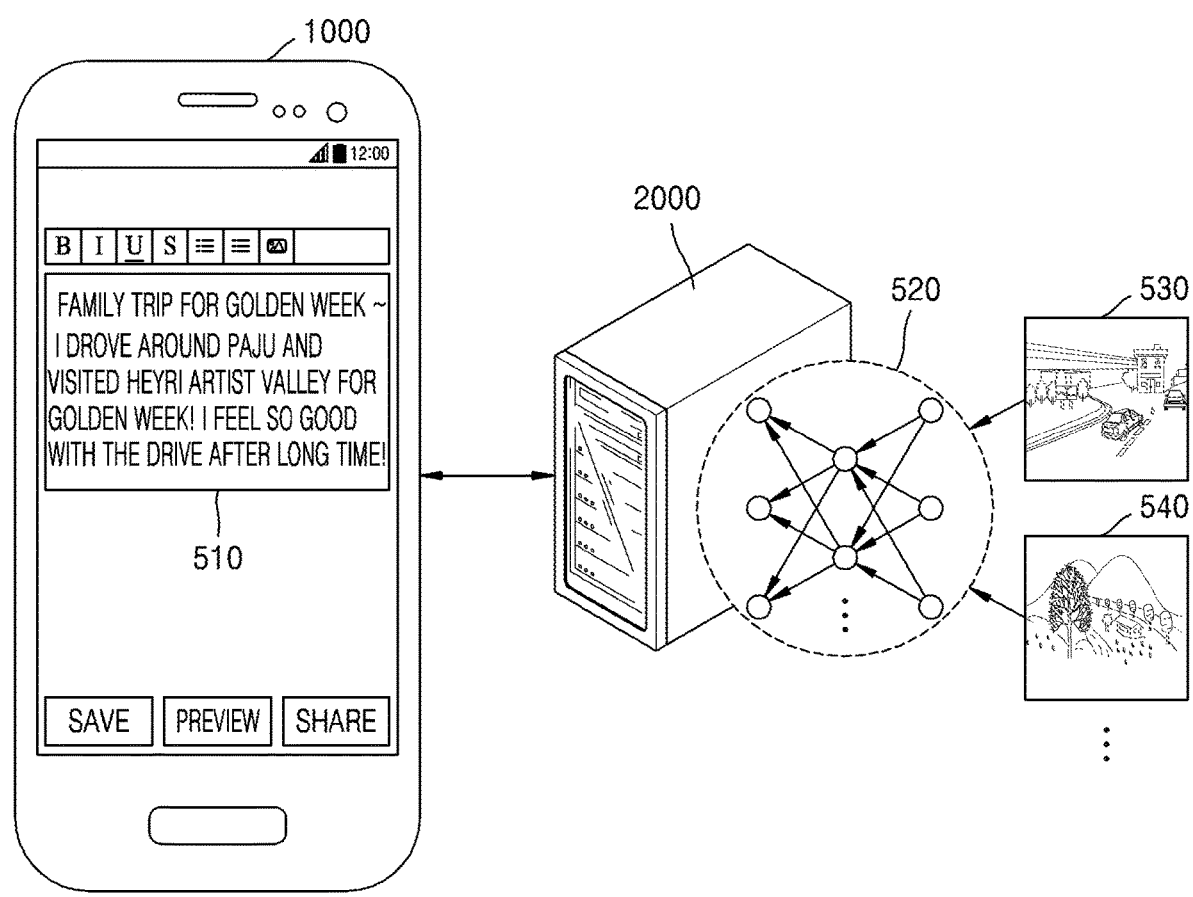
FIG. 5 illustrates an example in which an electronic device provides a text-related image through a server according to an embodiment of the present disclosure.

FIG. 5 illustrates an example in which an electronic device provides a text-related image through a server according to an embodiment of the present disclosure.

In FIG. 5, a repeated part of FIG. 4 will not be provided.

In an embodiment, referring to FIG. 5, the server 2000 establishes a first AI data recognition model for a text and a second AI data recognition model 520 for an image by using general-purpose data.

The server 2000 according to an embodiment may store a result of applying the second AI data recognition model 520 to user-accessible images including a first image 530 and a second image 540. In an embodiment, if the server 2000 receives a text 510 from the electronic device 1000, the server 2000 may derive a result of applying the first AI data recognition model to the received text 510 and compare the derived result with a result previously stored for the user-accessible images to determine a text-related image.

In an embodiment, the server 2000 may transmit the first AI data recognition model and the second AI data recognition model 520, as well as the text-related image, to the electronic device 1000. For example, according to an embodiment, the server 2000 may establish AI data recognition models and receive data such as the text 510 from the electronic device 1000 for a specific time to customize the AI data recognition models for the user, and then transmit the AI data recognition models to the electronic device 1000 to allow the electronic device 1000 to determine the text-related image.

Figure 6:
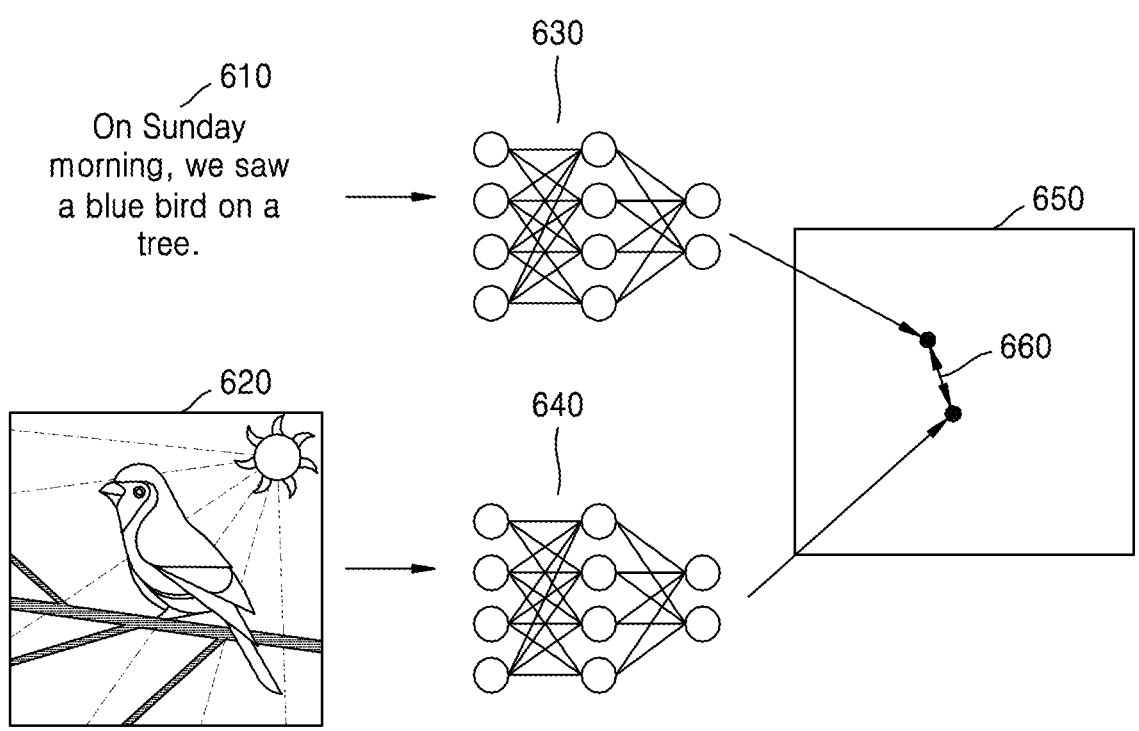
FIG. 6 is a view for describing a method of determining a text-related image based on a degree of relatedness between results of application of an artificial intelligence (AI) data recognition model according to an embodiment of the present disclosure.

FIG. 6 is a view for describing a method of determining a text-related image based on a degree of relatedness between results of application of an AI data recognition model according to an embodiment of the present disclosure.

In an embodiment, referring to FIG. 6, the electronic device 1000 may determine, as the text-related image, at least one image in which a distance 660 on a vector space 650 between a text's vector value, derived by applying a first AI data recognition model 630 to a text 610, and an image's vector value, derived by applying a second AI data recognition model 640 to an image 620.

In a disclosed embodiment, the "text's vector value" expresses information indicated by a text as a vector corresponding to a particular location on an m-dimension (m is an arbitrary natural number) vector space, and the "image's vector value" expresses information indicated by an image as a vector corresponding to a particular location on an n-dimension (n is an arbitrary natural number) vector space, by selectively reflecting context information recognized using metadata about the image. Herein, m and n may be equal to each other.

In an embodiment, the text 610 is not parsed in the unit of a word or a phrase, and the entire text may be input to the first AI data recognition model 630 which may output one vector value considering all situations that may be derived from the text 610. The image 620, instead of objects included in the image 620, may be input to the second AL data recognition model 640 which may output one vector value considering all situations that may be derived from the image 620.

In an embodiment, to allow the text's vector value and the image's vector value to be mapped onto the same vector space 650, the first AI data recognition model 630 and the second AI data recognition model 640 may be learned together. In an embodiment, the first AI data recognition model 630 and the second AI data recognition model 640 may be the same as each other.

In an embodiment, the electronic device 1000 may determine that a degree of relatedness between a text and an image (or a text-image relatedness degree) is high as a distance 660 between vector values mapped onto the same vector space 650 is short.

In an embodiment, metadata about an image may not be used as an input to an AI data recognition model for deriving an image's vector value. The metadata about the image may be used to provide a text-related image in another way. For example, the electronic device 1000 may display an image having GPS information matching a place expressed on the text with a high priority, regardless of a text-image relatedness degree, derived using an AI data recognition model.

Although it has been described that the electronic device 1000 performs learning of the first AI data recognition model 630 and the second AI data recognition model 640, the server 2000 or an external device may perform the learning. The electronic device 1000 may receive at least one AI data recognition model learned by the server 2000 or the external device through the network and use the AI data recognition model to determine a text-related image in the electronic device 1000.

Figure 7:
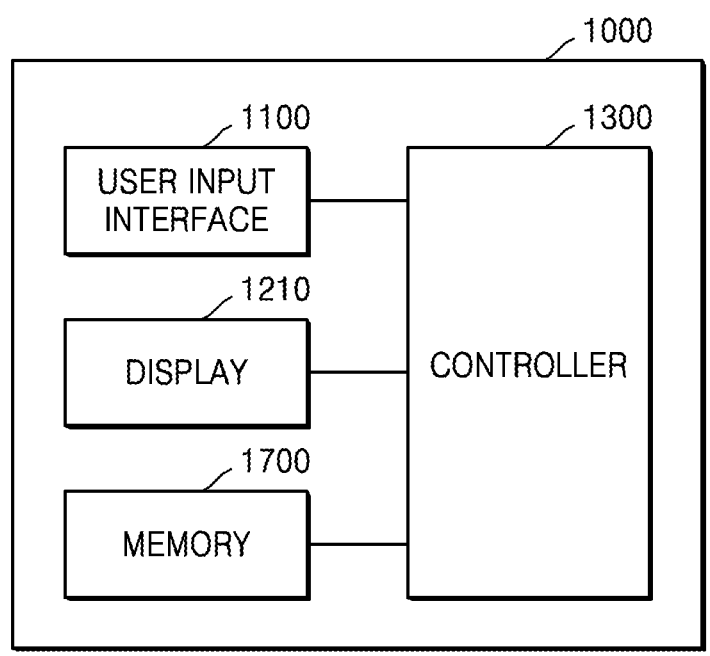
FIGS. 7, 8, and 9 are block diagrams of an electronic device according to various embodiments of the present disclosure.
Figure 8:
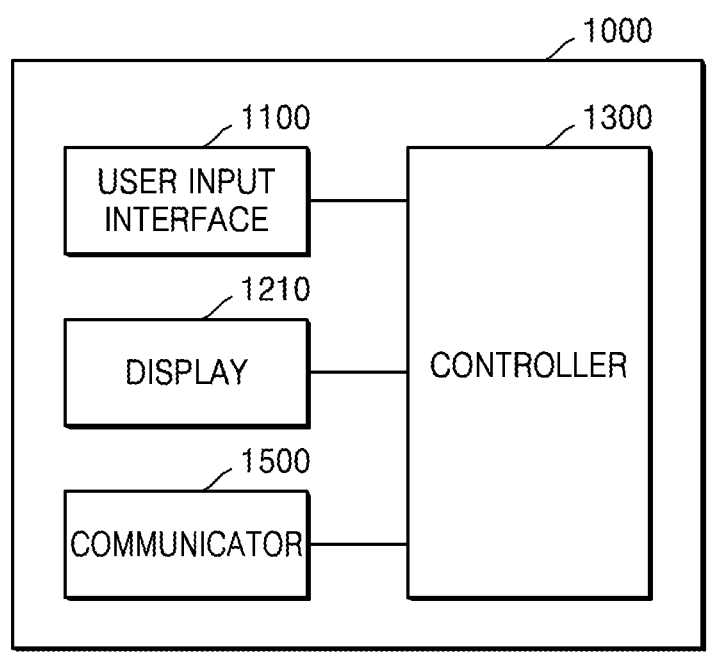
Figure 9:
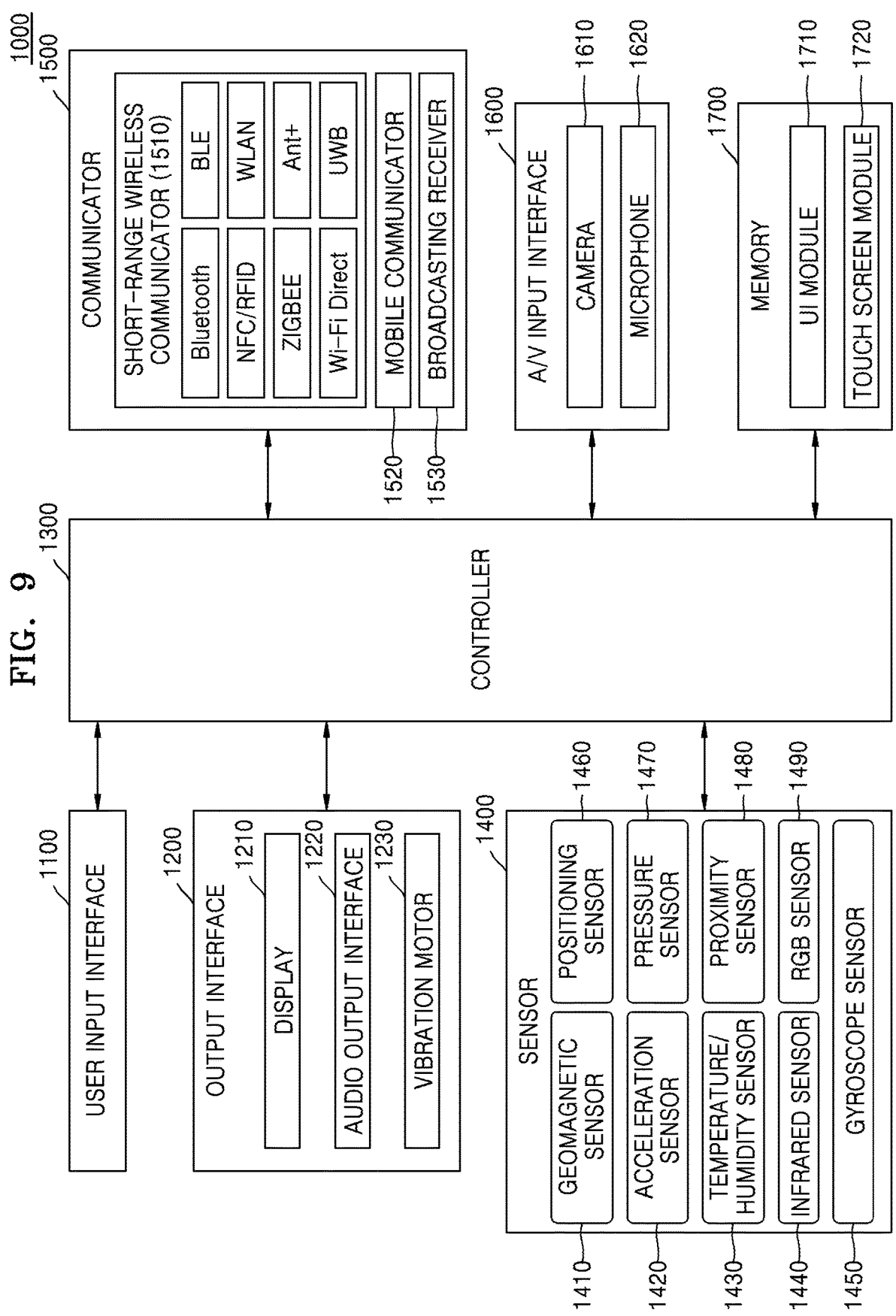

FIGS. 7, 8, and 9 are block diagrams of an electronic device according to various embodiments of the present disclosure.

Referring to FIG. 7, the electronic device 1000 according to an embodiment may include a user input interface 1100, a display 1210, a controller (or at least one processor) 1300, and a memory 1700. However, all the illustrated elements are not essential elements. The electronic device 1000 may be implemented with a larger or smaller number of elements than the illustrated elements.

Referring to FIG. 8, the electronic device 1000 according to an embodiment of the present disclosure may include the user input interface 1100, the display 1210, the controller 1300, and a communicator 1500 (e.g., a transceiver). However, all the illustrated elements are not essential elements. The electronic device 1000 may be implemented with a larger or smaller number of elements than the illustrated elements.

For example, referring to FIG. 9, the electronic device 1000 according to an embodiment of the present disclosure may further include an output interface 1200, a sensor 1400, and an audio/video (A/V) input interface 1600 in addition to the user input interface 1100, the controller 1300, the communicator 1500, and the memory 1700.

Hereinbelow, the foregoing elements will be described in detail.

The user input interface 1100 is a means through which a user inputs data for controlling the electronic device 1000. For example, the user input interface 1100 may include, but not limited to, a keypad, a dome switch, a touch pad (a capacitive overlay type, a resistive overlay type, an infrared beam type, a surface acoustic wave type, an integral strain gauge type, a piezoelectric effect type, etc.), a jog wheel, a jog switch, etc.

The user input interface 1100 receives a user input. For example, the user input interface 1100 may receive a user input for obtaining a text and a user input for executing an application. The user input interface 1100 may receive a user input for selecting one or more of at least one displayed images.

The output interface 1200 outputs an audio signal, a video signal, or a vibration signal, and may include the display 1210, an audio output interface 1220, a vibration motor 1230, and so forth.

The display 1210 is controlled by the controller 1300 described later to display information processed in the electronic device 1000. The display 1210 displays at least one text-related image.

When the display 1210 and a touch pad are constructed as a touch screen in a layer structure, the display 1210 may be used as an input device as well as an output device. The display 1210 may include at least one of a liquid crystal display (LCD), a thin film transistor (TFT) LCD, an organic light-emitting diode (OLED), a flexible display, a three-dimensional (3D) display, and an electrophoretic display. According to implementation types of the electronic device 1000, the electronic device 1000 may include two or more displays 1210. In this case, the two or more displays 1210 may be disposed to face each other by using a hinge.

The audio output interface 1220 outputs audio data received from the communicator 1500 or stored in the memory 1700. The audio output interface 1220 outputs an audio signal related to a function (e.g., a call signal receiving sound, a message receiving sound, an alarm sound, etc.) performed in the electronic device 1000. The audio output interface 1220 may include a speaker, a buzzer, or the like.

The vibration motor 1230 outputs a vibration signal. For example, the vibration motor 1230 may output a vibration signal corresponding to output of audio data or video data (e.g., a call signal receiving sound, a message receiving sound, etc.). The vibration motor 1230 outputs a vibration signal if a touch is input to a touch screen.

The controller 1300 controls an overall operation of the electronic device 1000. The controller 1300 may include at least one processor. The controller 1300 may include a plurality of processors or one processor in an integrated form depending on a function and a role thereof.

For example, the controller 1300 may control in overall the user input interface 1100, the output interface 1200, the sensor 1400, the communicator 1500, and the A/V input interface 1600 by executing programs stored in the memory 1700. The controller 1300 controls the user input interface 1100, the output interface 1200, the sensor 1400, the communicator 1500, and the A/V input interface 1600 to allow the electronic device 1000 to determine at least one text-related image.

More specifically, the controller 1300 derives a degree of relatedness between a result of applying the first AI data recognition model to a text and a result of applying the second AI data recognition model to a user-accessible image to determine at least one text-related image. For example, the controller 1300 may determine, as the at least one text-related image, at least one image in which a distance between a text's vector value derived by applying the first AI data recognition model to the text and an image's vector value derived by applying the second AI data recognition model to the user-accessible image is less than or equal to a predetermined value. The controller 1300 obtains metadata regarding the user-accessible image and determines the at least one text-related image based on a degree of relatedness reflecting context information recognized from the metadata.

In an embodiment, the controller 1300 may determine an image related to a text obtained later, based on an AI data recognition model newly learned by a user input of selecting an image. In an embodiment, based on a degree of relatedness between texts obtained before and after image selection and results of applying a newly learned AI data recognition model to a user-accessible image, the controller 1300 may determine at least one image related to the obtained texts.

The controller 1300 controls the communicator 1500 to transmit and receive a text, a user-accessible image, and at least one image related to the text to and from another electronic device and the server 2000.

The sensor 1400 senses a state of the electronic device 1000 or a state near the electronic device 1000, and delivers sensed information to the controller 1300.

The sensor 1400 may include, but not limited to, at least one of a geomagnetic sensor 1410, an acceleration sensor 1420, a temperature/humidity sensor 1430, an infrared sensor 1440, a gyroscope sensor 1450, a positioning sensor (e.g., a global positioning system (GPS)) 1460, a pressure sensor 1470, a proximity sensor 1480, and a red/green/blue (RGB) sensor (or an illuminance sensor) 1490. A function of each sensor may be intuitively construed from a name of each sensor by those of ordinary skill in the art, and thus will not be described in detail.

The communicator 1500 may include one or more elements that enable the electronic device 1000 to communicate with another device (not shown) or the server 2000. For example, the communicator 1500 may include a short-range wireless communicator 1510, a mobile communicator 1520 (e.g., a mobile transceiver), and a broadcasting receiver 1530.

The short-range wireless communicator 1510 may include, but not limited to, a BT low energy (BLE) communicator, a near field communication (NFC) unit, a wireless local area network (WLAN) (Wi-Fi) communicator, a ZigBee communicator, an infrared data association (IrDA) communicator, a Wi-Fi direct (WFD) communicator, an ultra-wideband (UWB) communicator, and an Ant+ communicator.

The mobile communicator 1520 transmits and receives a radio signal to and from at least one of a base station, an external terminal, and a server over a mobile communication network. Herein, the radio signal may include various forms of data corresponding to transmission/reception of a voice call signal, a video communication call signal, or a text/multimedia message.

The broadcasting receiver 1530 receives a broadcast signal and/or broadcasting-related information from an external source through a broadcasting channel. The broadcasting channel may include a satellite channel and a terrestrial channel According to implementation examples, the electronic device 1000 may not include the broadcasting receiver 1530.

The communicator 1500 is controlled by the controller 1300 to transmit and receive data to and from another electronic device and the server 2000. The communicator 1500 transmits data to another electronic device directly or via the server 2000. The communicator 1500 receives data from another electronic device directly or via the server 2000.

The A/V input interface 1600 inputs an audio signal or a video signal, and may include a camera 1610, a microphone 1620, and so forth. The camera 1610 obtains an image frame such as a still image or a moving image in a video communication mode or a photographing mode through an image sensor. The image captured by the image sensor is processed by the controller 1300 or a separate image processor (not shown).

An image frame processed by the camera 1610 is stored in the memory 1700 or transmitted to an external source through the communicator 1500. Two or more cameras 1610 may be provided according to a structure aspect of the electronic device 1000.

The microphone 1620 receives an external audio signal and processes the received signal into electric voice data. For example, the microphone 1620 may receive an audio signal from an external device or a speaker. The microphone 1620 uses various noise cancellation algorithms for canceling noise generated during reception of the external audio signal.

The memory 1700 stores a program for processing and control of the controller 1300, and stores input/output data (e.g., a text, a text-related image, a result of selecting a text-related image by a user, etc.). The memory 1700 stores a computer-executable instruction.

The memory 1700 may include a storage medium of at least one type of a flash memory type, a hard disk type, a multimedia card micro type, a card type memory (e.g., a secure digital (SD) or extreme digital (xD) memory, etc.), a random-access memory (RAM), a static RAM (SRAM), a read-only memory (ROM), an electrically erasable programmable ROM (EEPROM), a programmable ROM (PROM), a magnetic memory, a magnetic disk, an optical disk, and so forth. The electronic device 1000 operates a web storage or a cloud server that performs a storage function of the memory 1700 on the Internet.

The programs stored in the memory 1700 may be classified into a plurality of modules depending on a function thereof, e.g., a user interface (UI) module 1710, a touch screen module 1720, and so forth.

The UI module 1710 provides a specialized UI or graphic UI (GUI) interworking with the electronic device 1000 for each application. The touch screen module 1720 senses a touch gesture of a user on a touch screen and delivers information about the touch gesture to the controller 1300. The touch screen module 1720 according to an embodiment recognizes and analyzes a touch code. The touch screen module 1720 is configured with separate hardware including a controller.

To sense a touch or proximity touch on the touch screen, various sensors may be provided inside or near the touch screen. An example of the sensor for sensing a touch on the touch screen may be a tactile sensor. The tactile sensor refers to a sensor that senses a touch by a particular object to the extent or larger to which a person feels the touch. The tactile sensor senses a lot of information such as the roughness of a contact surface, the hardness of a contact object, the temperature of a contact point, etc.

An example of the sensor for sensing a touch on the touch screen may be a proximity sensor.

The proximity sensor refers to a sensor that detects existence or absence of an object that approaches or is in proximity to a detection surface by using the force of an electromagnetic field or infrared rays, without a mechanical contact. Examples of the proximity sensor may include a transmission optoelectronic sensor, a direct reflective optoelectronic sensor, a mirror reflective optoelectronic sensor, a RF oscillation proximity sensor, an electrostatic capacity proximity sensor, a magnetic proximity sensor, an infrared proximity sensor, and so forth.

Meanwhile, the structure of the electronic device 1000 illustrated in FIGS. 7 through 9 is an embodiment, and each element of the electronic device 1000 may be integrated, added, or omitted according to specifications of the electronic device 1000 to be implemented. That is, when necessary, two or more elements may be integrated into one element or one element may be divided into two or more elements. A function executed in each element (or module) is intended to describe various embodiments, and a detailed operation or apparatus thereof does not limit the scope of the present disclosure.

Figure 10:
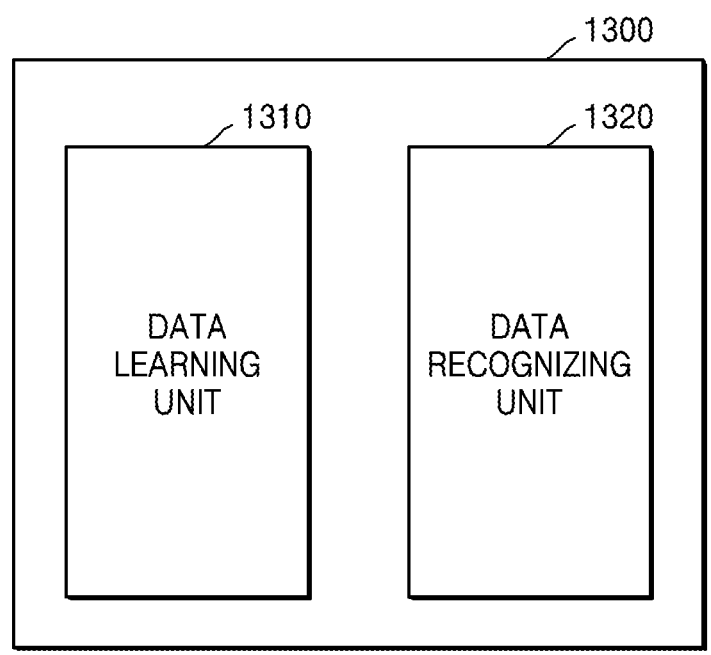
FIG. 10 is a detailed block diagram of a controller according to an embodiment of the present disclosure.

FIG. 10 is a block diagram of the processor 1300 according to an embodiment of the present disclosure.

Referring to FIG. 10, the processor 1300 according to an embodiment may include a data learning unit 1310 and a data recognizing unit 1320 (e.g., a data recognizer).

The data learning unit 1310 analyzes an image and recognizes contents of data to learn a criterion for determining a degree of relatedness between the image and the text. The model learning unit 1310-4 of the server 2000 may learn a criterion regarding which data is to be used to determine the degree of relatedness between the text and the image and regarding how to determine the text-image relatedness using the data. The model learning unit 1310-4 obtains data to be used for learning and applies the obtained data to a data recognition model to be described later, thereby learning the criterion for determining the text-image relatedness.

The data recognizing unit 1320 determines the text-image relatedness based on the data. The data recognizing unit 1320 recognizes contents derivable from the text and contents derivable from the image based on specific data, by using a learned AI data recognition model. The data recognizing unit 1320 obtains data according to the criterion that is preset by learning and uses the data recognition model with the obtained data as an input value, thereby determining the text-image relatedness based on the data. A result output from the data recognition model with the obtained data as the input value may be used to update the data recognition model.

At least one of the data learning unit 1310 and the data recognizing unit 1320 may be manufactured in the form of at least one hardware chip and mounted on the electronic device 1000. For example, at least one of the data learning unit 1310 and the data recognizing unit 1320 may be manufactured in the form of a dedicated hardware chip for artificial intelligence (AI), or may be manufactured as a part of an existing general-purpose processor (e.g., a central processing unit (CPU), or an application processor) or a dedicated graphic processor (e.g., a graphics processing unit (GPU)) and mounted on various electronic devices.

In this case, the data learning unit 1310 and the data recognizing unit 1320 may be mounted on one electronic device, a server, or separate electronic devices or a server. For example, one of the data learning unit 1310 and the data recognizing unit 1320 may be included in one electronic device 1000, and the other may be included in a server. The data learning unit 1310 and the data recognizing unit 1320 may be connected in a wired or wireless manner, such that model information established by the data learning unit 1310 may be provided to the data recognizing unit 1320 or data input to the data recognizing unit 1320 may be provided to the data learning unit 1310 as additional learning data.

Meanwhile, at least one of the data learning unit 1310 and the data recognizing unit 1320 may be implemented with a software module. When at least one of the data learning unit 1310 and the data recognizing unit 1320 may be implemented with a software module (or a program module including an instruction), the software module may be stored in a non-transitory computer-readable medium. In this case, at least one software module is provided by an operating system (OS) or by an application. Alternatively, a part of the at least one software module may be provided by an OS and another part thereof may be provided by an application.

Figure 11:
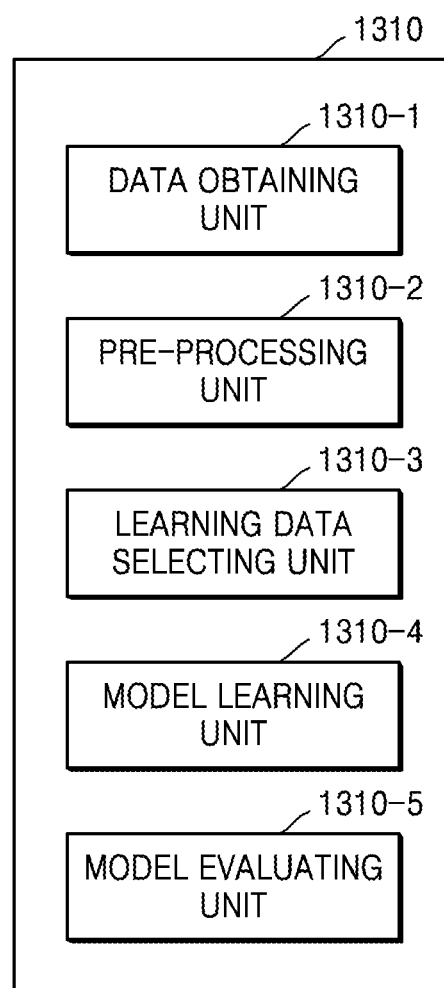
FIG. 11 is a detailed block diagram of a data learning unit according to an embodiment of the present disclosure.

FIG. 11 is a block diagram of a learner according to an embodiment of the present disclosure.

Referring to FIG. 11, the data learning unit 1310 according to an embodiment may include a data obtaining unit 1310-1 (e.g., a data obtainer), a pre-processing unit 1310-2 (e.g., a pre-processor), a learning data selecting unit 1310-3 (e.g., a learning data selector), a model learning unit 1310-4 (e.g., a model learner), and a model evaluating unit 1310-5 (e.g., a model evaluator).

The data obtaining unit 1310-1 obtains data needed to determine a text-image relatedness. The data obtaining unit 1310-1 obtains data needed for learning for determining the text-image relatedness.

For example, the data obtaining unit 1310-1 may obtain speech data, video data (e.g., an image, video, etc.), text data, or biometric signal data. The data obtaining unit 1310-1 may receive data through an input device (e.g., a microphone, a camera, a sensor, etc.) of the electronic device 1000. Alternatively, the data obtaining unit 1310-1 obtains data through an external device capable of communicating with the electronic device 1000.

For example, the data obtaining unit 1310-1 may receive a data input from a user, retrieve data previously stored in the electronic device 1000, or receive data from a server. The data obtaining unit 1310-1 may also obtain necessary data by combining the data previously stored in the electronic device 1000, data sensed by the electronic device 1000, the data input from the user, and the data obtained from the server. The data may include at least one of a text, an image, video, metadata about an image, etc. The data obtaining unit 1310-1 may receive input of an image. For example, the data obtaining unit 1310-1 may receive an image through a camera of the electronic device 1000 including the data learning unit 1310 or an external camera capable of communicating with the electronic device 1000 including the data learning unit 1310. Herein, the camera may include one or more image sensors (e.g., a front sensor or a rear sensor), a lens, an image signal processor (ISP), or a flash (e.g., an LED, a xenon lamp, etc.).

The data obtaining unit 1310-1 may obtain a text. For example, the data obtaining unit 1310-1 may receive input of data from the user through a user input interface of the electronic device 1000. The data obtaining unit 1310-1 may receive a text through a web server capable of communicating with the electronic device 1000 including the data learning unit 1310. For example, the data obtaining unit 1310-1 may obtain a text from another application of the electronic device 1000.

The pre-processing unit 1310-2 pre-processes the obtained data, such that the obtained data may be used in learning for determining the text-image relatedness. The pre-processing unit 1310-2 processes the obtained data into a preset format, such that the model learning unit 1310-4 may use the obtained data in learning for determining the text-image relatedness.

The pre-processing unit 1310-2 may generate one combined image by overlapping at least some of a plurality of input images (or frames), based on a common region included in each of the plurality of input images. The common region may be a region including an identical or similar common object (e.g., a thing, an animal or a plant, a person, etc.) in each of the plurality of images. The common region may be a region including the same or similar color, shade, read/green/blue (RGB) value, or cyan/magenta/yellow/black (CMYK) value in each of the plurality of images.

The learning data selecting unit 1310-3 selects data needed for learning from pre-processed data. The selected data may be provided to the model learning unit 1310-4. The learning data selecting unit 1310-3 selects data needed for learning from pre-processed data, according to a preset criterion for determining a text-image relatedness. The learning data selecting unit 1310-3 may also select data according to a criterion that is preset by learning of the model learning unit 1310-4.

For example, to learn determination of the text-image relatedness, data inserted by the user of the electronic device 1000, together with input of a text, may be selected as data needed for the learning.

The model learning unit 1310-4 learns a criterion regarding how to determine the text-image relatedness based on learning data. The model learning unit 1310-4 may also learn a criterion regarding which learning data is to be used to determine the text-image relatedness.

The model learning unit 1310-4 also learns a model for a text and a model for an image to determine the text-image relatedness. The model learning unit 1310-4 may also learn an AI data recognition model used to determine the text-image relatedness by using learning data. In this case, the data recognition model may be previously established. For example, the data recognition model may be previously established using input basic learning data (e.g., sample images, etc.).

The AI data recognition model may be established based on an application field of the recognition model, a purpose of learning, computer performance of a device, etc. AI The data recognition model may be based on, for example, a neural network. For example, a model such as, but not limited to, a deep neural network (DNN), a recurrent neural network (RNN), a bidirectional recurrent deep neural network (BRDNN), or the like may be used as the AI data recognition model.

Various embodiments, if there are a plurality of AI data recognition models established in advance, the model learning unit 1310-4 determines an AI data recognition model having a high correlation between input learning data and basic learning data as an AI data recognition model to be learned. In this case, the basic learning data may be classified in advance according to a data type, and the AI data recognition model may be established in advance for each data type. For example, the basic learning data may be classified depending on various criteria such as a region where learning data is generated, a time in which learning data is generated, a size of learning data, a genre of learning data, a generator of learning data, a type of an object in learning data, and so forth.

The model learning unit 1310-4 may learn the AI data recognition model using a learning algorithm such as error back-propagation or gradient descent.

The model learning unit 1310-4 causes the AI data recognition model to learn using supervised learning having learning data as an input value. The model learning unit 1310-4 may cause the AI data recognition model to learn using unsupervised learning in which the AI data recognition model discovers a criterion for determining the text-image relatedness by learning a type of data needed for determining the text-image relatedness without separate supervision. The model learning unit 1310-4 learns the AI data recognition model using reinforcement learning based on a feedback regarding whether a result of determining the text-image relatedness based on learning is correct or not.

Once the AI data recognition model is learned, the model learning unit 1310-4 stores the learned AI data recognition model. In this case, the model learning unit 1310-4 stores the learned AI data recognition model in a memory of the electronic device 1000 including the data recognizing unit 1320. Alternatively, the model learning unit 1310-4 stores the learned AI data recognition model in a memory of the electronic device 1000 including the data recognizing unit 1320 to be described later. Alternatively, the model learning unit 1310-4 stores the learned AI data recognition model in a memory of a server wiredly or wirelessly connected with the electronic device 1000.

In this case, the memory in which the learned AI data recognition model is stored may also store an instruction or data related to at least one other element of the electronic device 1000. The memory may also store software and/or programs. The program may include a kernel, middleware, an application programming interface (API), and/or an application program (or "application"), and the like.

If a recognition result output after input of evaluation data to the AI data recognition model fails to satisfy a predetermined criterion, the model evaluating unit 1310-5 may cause the model learning unit 1310-4 to learn again. In this case, the evaluation data may be preset data for evaluating the AI data recognition model.

For example, an image selected as a text-related image by the user is input to the second AI data recognition model, and the text is input to the first AI data recognition model, such that if a difference between two outputs exceeds a preset value, the model learning unit 1310-4 may be evaluated as having to perform learning again.

For example, the model evaluating unit 1310-5 may evaluate that the predetermined criterion is not satisfied if among recognition results of the learned AI data recognition model regarding evaluation data, the number or rate of evaluation data having inaccurate recognition results exceeds a preset threshold value. For the predetermined criterion being defined as a rate of 2%, if the learned AI data recognition model outputs wrong recognition results for 20 or more evaluation data among a total of 1000 evaluation data, then the model evaluating unit 1310-5 may evaluate that the learned AI data recognition model is not proper.

If there are a plurality of learned AI data recognition models, the model evaluating unit 1310-5 evaluates whether each learned AI data recognition model satisfies the predetermined criterion, and determines a learned AI data recognition model satisfying the predetermined criterion as a final AI data recognition model. In this case, if a plurality of learned AI data recognition models satisfy the predetermined criterion, the model evaluating unit 1310-5 determines preset any one model or a predetermined number of models as a final AI data recognition model or final AI data recognition models in a higher evaluation grade order.

At least one of the data obtaining unit 1310-1, the pre-processing unit 1310-2, the learning data selecting unit 1310-3, the model learning unit 1310-4, and the model evaluating unit 1310-5 in the data learning unit 1310 may be manufactured in the form of at least one hardware chip and mounted on the electronic device 1000. For example, at least one of the data obtaining unit 1310-1, the pre-processing unit 1310-2, the learning data selecting unit 1310-3, the model learning unit 1310-4, and the model evaluating unit 1310-5 may be manufactured in the form of a dedicated hardware chip for AI, or may be manufactured as a part of an existing general-purpose processor (e.g., a CPU or an application processor) or a dedicated graphic processor (e.g., a GPU) and mounted on various electronic devices.

The data obtaining unit 1310-1, the pre-processing unit 1310-2, the learning data selecting unit 1310-3, the model learning unit 1310-4, and the model evaluating unit 1310-5 may be mounted on one electronic device, a server, or on separate electronic devices, respectively. For example, some of the data obtaining unit 1310-1, the pre-processing unit 1310-2, the learning data selecting unit 1310-3, the model learning unit 1310-4, and the model evaluating unit 1310-5 may be included in the electronic device, and some others thereof may be included in a server.

At least one of the data obtaining unit 1310-1, the pre-processing unit 1310-2, the learning data selecting unit 1310-3, the model learning unit 1310-4, and the model evaluating unit 1310-5 may be implemented with a software module. When at least one of the data obtaining unit 1310-1, the pre-processing unit 1310-2, the learning data selecting unit 1310-3, the model learning unit 1310-4, and the model evaluating unit 1310-5 is implemented with a software module (or a program module including an instruction), the software module may be stored in a non-transitory computer-readable medium. In this case, at least one software module is provided by an operating system (OS) or by an application. Alternatively, a part of the at least one software module may be provided by an OS and another part thereof may be provided by an application.

Figure 12:
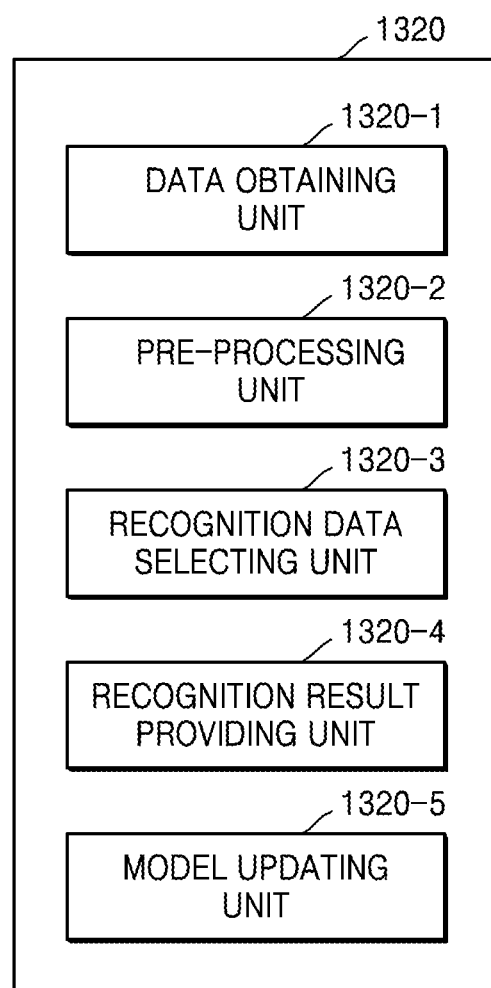
FIG. 12 is a detailed block diagram of a data learning unit according to an embodiment of the present disclosure.

FIG. 12 is a block diagram of the data recognizing unit 1320 according to an embodiment of the present disclosure.

Referring to FIG. 12, the data recognizing unit 1320 according to an embodiment may include a data obtaining unit 1320-1 (e.g., a data obtainer), a pre-processing unit 1320-2 (e.g., a pre-processor), a recognition data selecting unit 1320-3 (e.g., a recognition data selector), a recognition result providing unit 1320-4 (e.g., a recognition provider), and a model updating unit 1320-5 (e.g., a model updater).

The data obtaining unit 1320-1 obtains data needed for determining the text-image relatedness, and the pre-processing unit 1320-2 pre-processes the obtained data such that the data obtained for determining the text-image relatedness may be used. The pre-processing unit 1320-2 processes the obtained data into a preset format, such that the recognition result providing unit 1320-4 may use the data obtained for determining the text-image relatedness.

The recognition data selecting unit 1320-3 selects the data needed for determining the text-image relatedness from the pre-processed data. The selected data may be provided to the recognition result providing unit 1320-4. The recognition data selecting unit 1320-3 selects the entire pre-processed data or a part thereof, according to a preset criterion for determining the text-image relatedness. The learning data selecting unit 1320-3 may also select data according to a criterion that is preset by learning of the model learning unit 1310-4.

The recognition result providing unit 1320-4 applies the selected data to the AI data recognition model to determine the text-image relatedness. The recognition result providing unit 1320-4 provides a recognition result based on a data recognition purpose. The recognition result providing unit 1320-4 applies the selected data to the AI data recognition model by using data selected by the recognition data selecting unit 1320-3 as an input value. The recognition result may be determined by the AI data recognition model.

For example, a recognition result of data may be provided in the form of a text, audio, video, an image, or an instruction (e.g., an application execution instruction, a module function execution instruction, etc.). The recognition result providing unit 1320-4 applies user's biometric signal data to the AI data recognition model and provides a recognition result of the data. For example, the recognition result providing unit 1320-4 may provide a result of recognizing an object included in an image. The recognition result may be state information of the object included in the image, surrounding state information of the object, etc. The recognition result providing unit 1320-4 may provide, as the state information of the object, 'exercising', 'emergency', 'resting', 'at table', 'shopping', 'in a meeting', 'sleeping', and so forth, in the form of a text, voice, a moving image, an image, a command, etc.

The model updating unit 1320-5 updates the AI data recognition model based on evaluation with respect to the recognition result provided by the recognition result providing unit 1320-4. For example, the model updating unit 1320-5 provides the recognition result provided by the recognition result providing unit 1320-4 to the model learning unit 1310-4, allowing the model learning unit 1310-4 to update the AI data recognition model.

At least one of the data obtaining unit 1320-1, the pre-processing unit 1320-2, the recognition data selecting unit 1320-3, the recognition result providing unit 1320-4, and the model updating unit 1320-5 in the data recognizing unit 1320 may be manufactured in the form of at least one hardware chip and mounted on the electronic device 1000. For example, at least one of the data obtaining unit 1320-1, the pre-processing unit 1320-2, the recognition data selecting unit 1320-3, the recognition result providing unit 1320-4, and the model updating unit 1320-5 may be manufactured in the form of a dedicated hardware chip for AI, or may be manufactured as a part of an existing general-purpose processor (e.g., a CPU or an application processor) or a dedicated graphic processor (e.g., a GPU) and mounted on various electronic devices.

The data obtaining unit 1320-1, the pre-processing unit 1320-2, the recognition data selecting unit 1320-3, the recognition result providing unit 1320-4, and the model updating unit 1320-5 may be mounted on one electronic device or on separate electronic devices, respectively. For example, some of the data obtaining unit 1320-1, the pre-processing unit 1320-2, the recognition data selecting unit 1320-3, the recognition result providing unit 1320-4, and the model updating unit 1320-5 may be included in the electronic device 1000 or some others thereof may be included in a server.

At least one of the data obtaining unit 1320-1, the pre-processing unit 1320-2, the recognition data selecting unit 1320-3, the recognition result providing unit 1320-4, and the model updating unit 1320-5 may be implemented with a software module. When at least one of the data obtaining unit 1320-1, the pre-processing unit 1320-2, the recognition data selecting unit 1320-3, the recognition result providing unit 1320-4, and the model updating unit 1320-5 is implemented with a software module (or a program module including an instruction), the software module may be stored in a non-transitory computer-readable medium. In this case, at least one software module is provided by an operating system (OS) or by an application. Alternatively, a part of the at least one software module may be provided by an OS and another part thereof may be provided by an application.

Figure 13:
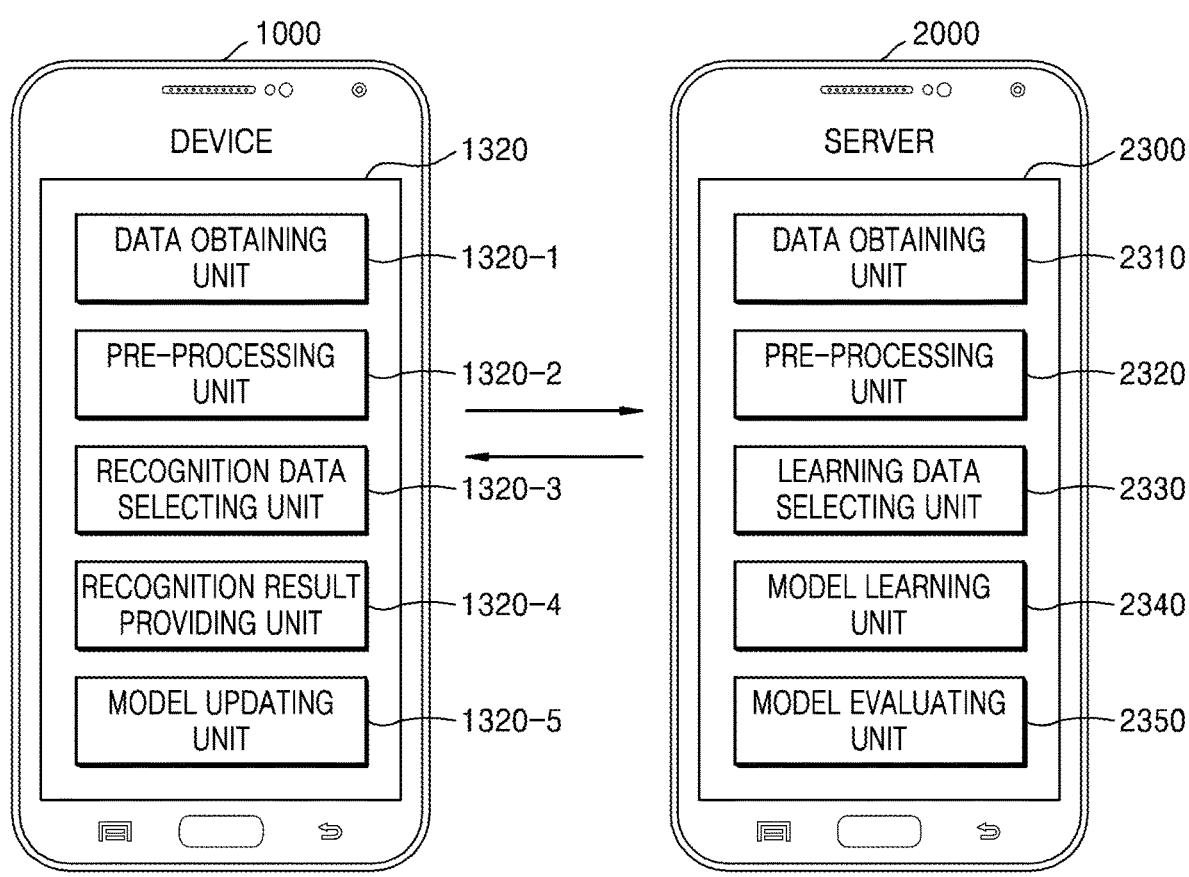
FIG. 13 illustrates an example where an electronic device and a server learn and recognize data by interworking with each other according to an embodiment of the present disclosure.

FIG. 13 illustrates an example where the electronic device 1000 and the server 2000 learn and recognize data by interworking with each other, according to an embodiment of the present disclosure.

Referring to FIG. 13, the server 2000 learns a criterion for determining a text-image relatedness, and the electronic device 1000 determines the text-image relatedness based on a learning result by the server 2000. The server includes a data learning unit 2300. The data learning unit 2300 includes a data obtaining unit 2310, a pre-processing unit 2320, a model learning unit 2340 and a model evaluating unit 2350.

In this case, a model learning unit 2340 (e.g., a model learner) of the server 2000 performs functions of the data learning unit 1310 shown in FIG. 11. The model learning unit 2340 of the server 2000 may learn a criterion regarding which data is to be used to determine the degree of relatedness between the text and the image and regarding how to determine the degree of relatedness between the text and the image using data. The model learning unit 2340 obtains data to be used for learning and applies the obtained data to a data recognition model to be described later, thereby learning the criterion for determining the degree of relatedness between the text and the image.

The recognition result providing unit 1320-4 of the electronic device 1000 determines the degree of relatedness between the text and the image by applying the data selected by the recognition data selecting unit 1320-3 to the data recognition model generated by the server 2000. For example, the recognition result providing unit 1320-4 may transmit the data selected by the recognition data selecting unit 1320-3 to the server 2000 and request the server 2000 to determine the degree of relatedness between the text and the image by applying the data selected by the recognition data selecting unit 1320-3 to the recognition model. The recognition result providing unit 1320-4 receives information about the degree of relatedness between the text and the image, determined by the server 2000, from the server 2000.

The recognition result providing unit 1320-4 of the electronic device 1000 receives the recognition model generated by the server 2000 and determines the degree of relatedness between the text and the image by using the received recognition model. In this case, the recognition result providing unit 1320-4 of the electronic device 1000 determines the degree of relatedness between the text and the image by applying the data selected by the recognition data selecting unit 1320-3 to the data recognition model received from the server 2000.

Meanwhile, the foregoing some embodiments may be written as programs executable on computers, and may be implemented on general-purpose digital computers operating the programs by using computer-readable recording medium.

The computer-readable recording medium may include storage medium such as magnetic storage medium (e.g., read-only memory (ROM), floppy disks, hard disks, etc.), optical recording medium (e.g., compact disc (CD)-ROMs, digital versatile discs (DVDs), etc.), and so forth.

While various embodiments of the present disclosure have been described with reference to the attached drawings, those of ordinary skill in the art to which the present disclosure pertains will appreciate that the present disclosure may be implemented in different detailed ways without departing from the technical spirit or essential characteristics of the present disclosure. Accordingly, the aforementioned embodiments should be construed as being only illustrative, but should not be constructed as being restrictive from all aspects.

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of providing an image, the method comprising:
    obtaining a text;
    determining at least one image related to the obtained text based on a degree of relatedness between a result obtained by inputting the obtained text into a first artificial intelligence (AI) data recognition model and a result obtained by inputting a user-accessible image into a second AI data recognition model; and
    displaying the determined at least one image.

2. The method of claim 1, wherein the determining of the at least one image comprises determining, as the at least one image related to the obtained text:
    at least one image in which a distance between a vector value of the obtained text, which is derived by applying the first AI data recognition model to the obtained text, and
    a vector value of the user-accessible image, which is derived by applying the second AI data recognition model to the user-accessible image, is less than or equal to a predetermined value.

3. The method of claim 1, wherein the displaying of the determined at least one image comprises displaying the determined at least one image to the user in an order of the degree of relatedness.

4. The method of claim 1, wherein the determining of the at least one image further comprises:
    obtaining metadata about the at least one image; and
    determining the at least one image related to the text based on the degree of relatedness reflecting context information recognized from the obtained metadata.

5. The method of claim 1, further comprising:
    receiving a user input of selecting an image from the displayed at least one image from the user,
    wherein the determining of the at least one image comprises determining an image related to a text obtained later, based on the second AI data recognition model newly learned based on a result of the selection.

6. The method of claim 5, wherein the determining of the at least one image comprises determining at least one image related to the obtained texts, based on a degree of relatedness between results of applying a newly learned first AI data recognition model to texts obtained before and after the selection of the image and results of applying the newly learned second AI data recognition model to a user-accessible image.

7. The method of claim 1, wherein the user-accessible image comprises at least one of an image previously stored in an electronic device, an image receivable from an external device communicating with the electronic device, and an image receivable from a server.

8. The method of claim 1, wherein the determining of the at least one image comprises determining the at least one image related to the text in response to an application executed for an access of the user to the image.

9. A method of providing a text-related image, the method comprising:
    obtaining a text;

transmitting the obtained text and a request for at least one image related to the obtained text to a server;

receiving at least one image related to the transmitted text based on a degree of relatedness between a result obtained by inputting the transmitted text into a first artificial intelligence (AI) data recognition model and a result obtained by inputting a user-accessible image into a second AI data recognition model, in response to the request; and displaying the received at least one image based on the degree of relatedness.

10. An electronic device comprising:

a user input interface configured to obtain a text;

a memory configured to store a computer-executable instruction;

at least one processor coupled to the memory is configured to determine at least one image related to the obtained text based on a degree of relatedness between a result obtained by inputting the obtained text into a first artificial intelligence (AI) data recognition model and a result obtained by inputting a user-accessible image into a second AI data recognition model; and a display configured to display the determined at least one image.

11. The electronic device of claim 10, wherein the at least one processor is further configured to determine, as the at least one image related to the obtained text, at least one image in which a distance between a vector value of the obtained text, which is derived by applying the first AI data recognition model to the obtained text, and a vector value of the image, which is derived by applying the second AI data recognition model to the user-accessible image, is less than or equal to a predetermined value.

12. The electronic device of claim 10, wherein the display is further configured to display the determined at least one image in an order of the degree of relatedness.

13. The electronic device of claim 10, wherein the at least one processor is further configured to:

obtain metadata about the at least one image, and determine the at least one image related to the text based on the degree of relatedness reflecting context information recognized from the obtained metadata.

14. The electronic device of claim 10, wherein the user input interface is further configured to receive a user input of selecting an image from the at least one displayed image, and wherein the at least one processor is further configured to determine an image related to a text obtained later, based on the second AI data recognition model newly learned based on a result of the selection.

15. The electronic device of claim 14, wherein the at least one processor is further configured to determine at least one image related to the obtained texts, based on a degree of relatedness between results of applying a newly learned first AI data recognition model to texts obtained before and after the selection of the image and results of applying the newly learned second AI data recognition model to a user-accessible image.

16. The electronic device of claim 10, wherein the user-accessible image comprises at least one of an image previously stored in the electronic device, an image receivable from an external device communicating with the electronic device, and an image receivable from a server.

17. The electronic device of claim 10, wherein the at least one processor is further configured to determine the at least one image related to the text in response to an application executed for an access of the user to the image.

18. A non-transitory computer-readable storage medium configured to store one or more computer programs including instructions that, when executed by at least one processor, cause the at least one processor to perform the method of claim 9.

* * * * *